US012415395B1

(12) United States Patent
Kern et al.

(10) Patent No.: US 12,415,395 B1
(45) Date of Patent: Sep. 16, 2025

(54) DOUBLE-SHEAR CONTROL ARM MOUNT

(71) Applicant: Fox Factory, Inc., Duluth, GA (US)

(72) Inventors: Chadwick Joseph Kern, Three Rivers, MI (US); Cody Douglas Reynolds, Olivet, MI (US)

(73) Assignee: FOX FACTORY, INC., Duluth, GA (US)

( * ) Notice: Subject to any disclaimer, the term of this patent is extended or adjusted under 35 U.S.C. 154(b) by 0 days.

(21) Appl. No.: 18/808,210

(22) Filed: Aug. 19, 2024

(51) Int. Cl.
*B60G 7/02* (2006.01)
*B62D 25/08* (2006.01)

(52) U.S. Cl.
CPC ............. *B60G 7/02* (2013.01); *B62D 25/088* (2013.01); *B60G 2204/1432* (2013.01)

(58) Field of Classification Search
CPC ................................ B60G 7/02; B62D 25/088
See application file for complete search history.

(56) References Cited

U.S. PATENT DOCUMENTS

| | | | | |
|---|---|---|---|---|
| 4,057,120 A | * | 11/1977 | Roethlisberger | B60G 7/02 180/263 |
| 4,750,755 A | * | 6/1988 | Hayashi | B60G 15/068 280/124.136 |
| 5,169,171 A | * | 12/1992 | Ban | B60G 13/001 280/86.753 |
| 5,456,517 A | * | 10/1995 | Kalian | B62D 29/008 164/47 |
| 5,516,130 A | * | 5/1996 | Mitchell | B60G 7/001 280/124.134 |
| 5,536,035 A | | 7/1996 | Bautz et al. | |
| 5,915,727 A | * | 6/1999 | Bonnville | B62D 21/09 280/124.1 |
| 6,047,988 A | * | 4/2000 | Aloe | B60G 7/02 280/788 |

(Continued)

OTHER PUBLICATIONS

JD Fabrication 2005-2023 Tacoma Double Shear UCA Gusset Kit, Overland Outfitters, https://overlandoutfitters.shop/products/jd-fabrication-tacoma-double-shear-uca-gusset-kit (Publication Unknown) (Last Visited: Aug. 19, 2024).

(Continued)

*Primary Examiner* — Paul N Dickson
*Assistant Examiner* — Tiffany L Webb
(74) *Attorney, Agent, or Firm* — Perilla Knox & Hildebrandt LLP; Kenneth A. Knox

(57) ABSTRACT

A double-shear control arm mount is described that includes a base configured to affix to a vehicle portion, and arms extending from the base defining mounting regions positioned between the arms and the vehicle portion. The mounting regions can be below the arms in some implementations. The arms can include first and second arms positioned on opposing sides of the base. The first arm includes a first arm member and a first arm mounting surface angled relative to the first arm member, and the second arm includes a second arm member and a second arm mounting surface angled relative to the second arm member. The mounting regions include a first mounting region positioned between a first side of the vehicle portion and the first arm mounting surface, and a second mounting region positioned between a second side of the vehicle portion and the second arm mounting surface.

20 Claims, 9 Drawing Sheets

(56) References Cited

U.S. PATENT DOCUMENTS

| | | | | |
|---|---|---|---|---|
| 6,076,247 | A * | 6/2000 | Durand | B60G 7/005 |
| | | | | 29/515 |
| 6,113,144 | A * | 9/2000 | Lapic | B60G 11/16 |
| | | | | 280/788 |
| 6,719,314 | B1 * | 4/2004 | Schote | B60G 7/001 |
| | | | | 280/124.135 |
| 8,448,966 | B2 * | 5/2013 | Rawlinson | B62D 25/088 |
| | | | | 280/124.147 |

OTHER PUBLICATIONS

Upper Arm Double Shear Kit, Dirt King, https://dirtking.com/products/upper-arm-double-shear-kit-dk-811945 (Publication Unknown) (Last Visited: Aug. 19, 2024).

Toyota Double-Shear Kit / Upper Control Arm Bolt Reinforcement, Solo Motorsports, https://solomotorsports.com/shop/parts/toyota-parts/suspension-toyota-parts/toyota-w-y-upper-control-arm-double-shear-kit/ (Publication Unknown) (Last Visited: Aug. 19, 2024).

Upper Arm Double Shear Kit, Down South Motorsports, https://www.downsouthmotorsports.com/product/upper-arm-double-shear-kit-3/ (Publication Unknown) (Last Visited: Aug. 19, 2024).

* cited by examiner

DOUBLE-SHEAR CONTROL ARM MOUNT

TECHNICAL FIELD

The present disclosure generally relates to vehicle suspension systems, and more specifically to systems, methods, and devices for providing a double-shear control arm mount in a vehicle.

BACKGROUND

Vehicle suspension systems are designed to absorb shocks and maintain contact between tires and a road, thereby enhancing safety, the comfort of the ride, and the vehicle's handling capabilities. Some vehicle suspension systems, such as those provided in mass manufactured vehicles, are designed based on competing concerns and various trade-offs, namely, affordability, availability of materials, common use cases of riders, capacity to mass manufacture, desired suspension settings, and so forth. To date, many vehicles include "single shear" suspension components that can be subject to failure in moderate to extreme suspension scenarios. To this end, upper suspension control arms are often coupled to a vehicle in a single shear fashion.

BRIEF SUMMARY

According to an aspect of the present disclosure, a vehicle is disclosed, comprising: a first strut tower and a second strut tower; a first double-shear control arm mount affixed to the first strut tower, and a second double-shear control arm mount affixed to the second strut tower, each of the first and the second double-shear control arm mounts comprising a base and arms extending from sides of the base; a first upper suspension control arm coupled to the first strut tower and the arms of the first double-shear control arm mount; a second upper suspension control arm coupled to the second strut tower and the arms of the second double-shear control arm mount; and a strut bar having a first end coupled to the first double-shear control arm mount and a second end coupled to the second double-shear control arm mount.

The first double-shear control arm mount and the second double-shear control arm mount are affixed to the first strut tower and the second strut tower, respectively, using a plurality of bolts. The arms of the first double-shear control arm mount and the second double-shear control arm mount each comprise an arm member and an arm mounting surface angled relative to the arm member; and the first upper suspension control arm and the second upper suspension control arm each comprise mounting portions positioned in mounting regions defined as an area between respective ones of the strut towers and the arm mounting surface.

The first double-shear control arm mount and the second double-shear control arm mount each comprise strut bar brackets extending from a surface of a respective base, the strut bar brackets comprising a plurality of apertures; and the first end and the second end of the strut bar are coupled to the strut bar brackets of the first double-shear control arm mount and the second double-shear control arm mount, respectively, using a plurality of bolts.

According to a second aspect of the present disclosure, a double-shear control arm mount is disclosed, comprising: a base configured to affix to a vehicle portion; a first arm cantilevered with respect to the base extending in a first direction beyond the vehicle portion defining a first mounting region, the first arm comprising a first arm member and a first arm mounting surface angled relative to the first arm member, the first mounting region being positioned between the first arm mounting surface and the vehicle portion; and a second arm cantilevered with respect to the base extending in a second direction beyond the vehicle portion defining a second mounting region, the second arm comprising a second arm member and a second arm mounting surface angled relative to the second arm member, the second mounting region being positioned between the second arm mounting surface and the vehicle portion.

The first mounting region is sized and positioned to receive a first extension of an upper suspension control arm, and the second mounting region is sized and positioned to receive a second extension of the upper suspension control arm. The vehicle portion is a strut tower, the base comprises a plurality of apertures, and the double-shear control arm mount comprises a plurality of bolts configured for insertion through the apertures to form a bolt-on connection between the base and the strut tower.

The base comprises a base mounting plate and an arm mounting plate affixed to the base mounting plate, the first arm and the second arm being integral with the arm mounting plate. The base mounting plate is affixed directly to a top surface of the vehicle portion, and the arm mounting plate is at least partially raised from the top surface of the vehicle portion. The first arm and the second arm are configured to flex relative to the base.

The double-shear control arm mount further comprises strut bar brackets extending from a surface of the base comprising a plurality of apertures, the double-shear control arm mount comprising a plurality of bolts configured to be positioned through the apertures to retain a strut bar relative to the base. The vehicle portion is a lower frame or a strut tower.

The first arm mounting surface is angled relative to the first arm member at a first angle between 80 and 120 degrees, and the second arm mounting surface is angled relative to the second arm member at a second angle between 80 and 120 degrees. The first arm and the second arm are configured to be positioned above coupling points of an upper suspension control arm.

According to a third aspect, a system is described, comprising: a double-shear control arm mount, comprising: a base configured to affix to a vehicle portion; and arms extending from the base defining mounting regions positioned between the arms and the vehicle portion, wherein the mounting regions are positioned below the arms. The arms comprise a first arm and a second arm positioned on opposing sides of the base.

The first arm comprises a first arm member and a first arm mounting surface angled relative to the first arm member; and the second arm comprises a second arm member and a second arm mounting surface angled relative to the second arm member. The mounting regions comprise a first mounting region positioned between a first side of the vehicle portion and the first arm mounting surface, and a second mounting region positioned between a second side of the vehicle portion and the second arm mounting surface.

The system further comprises an upper suspension control arm having a first mounting portion positioned in the first mounting region, and a second mounting portion positioned in the second mounting region. The double-shear control arm mount is configured to bolt on to the vehicle portion using a plurality of bolts. Strut bar brackets extend from a surface of the base that comprise a plurality of apertures. The system further comprises a strut bar having one end coupled to the double-shear control arm mount using a plurality of bolts positioned through the apertures and aligned apertures of the strut bar that retains the strut bar relative to the base.

According to a fourth aspect, a method is disclosed comprising providing one or more of any of the aforementioned upper suspension control arm mount, vehicle, or upper suspension control arm.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
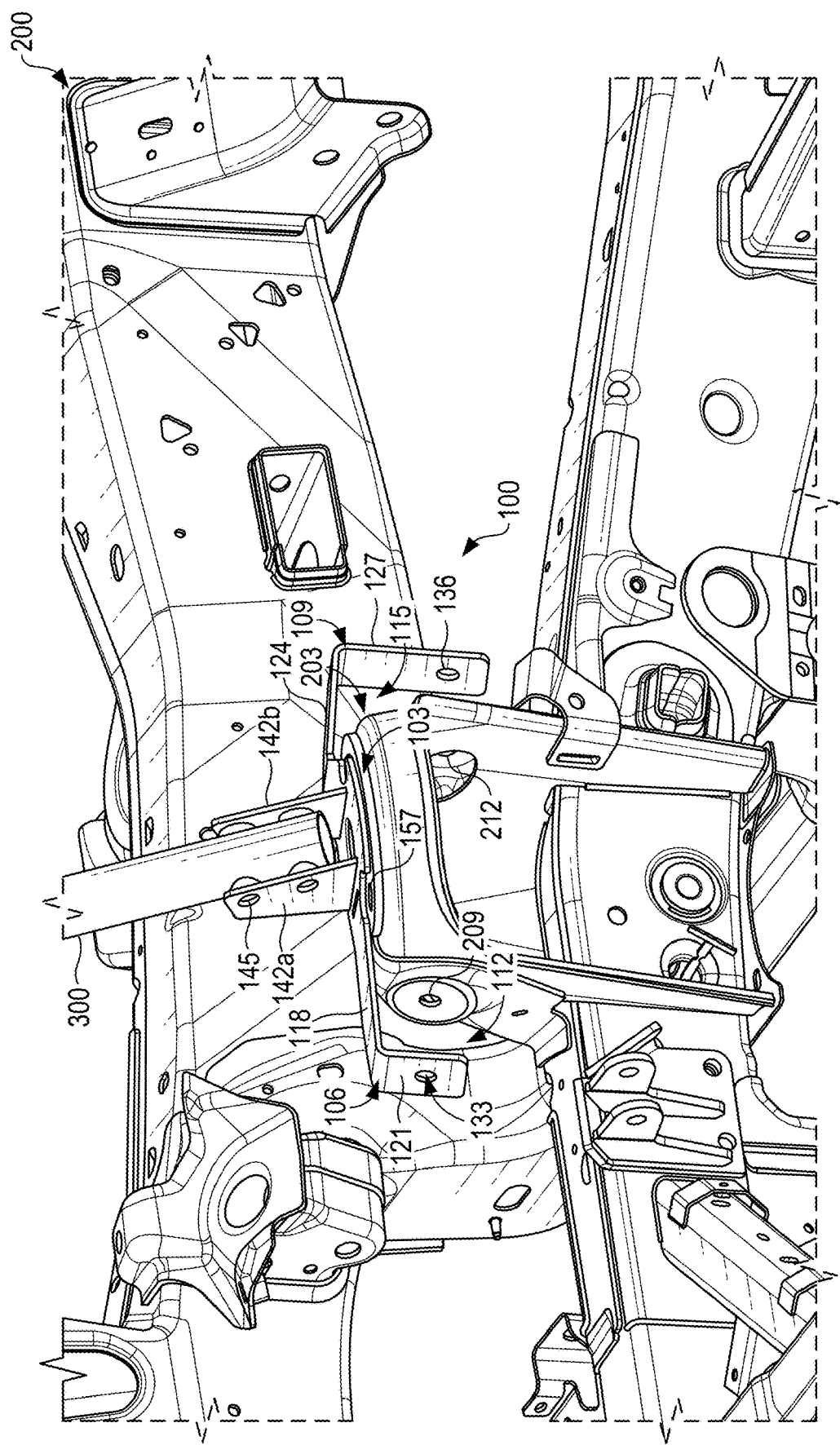
FIG. 1 is a perspective view of a double-shear control arm mount shown relative to a vehicle portion according to various embodiments of the present disclosure.

The present disclosure relates to a double-shear control arm mount that enables upper suspension control arms and like devices to be affixed to a vehicle frame or other device in a double-shear manner. As noted above, many vehicles include single shear suspension components that can be subject to failure in moderate to extreme suspension scenarios. Notably, upper suspension control arms are often coupled to a vehicle in a single shear fashion. For instance, a single bolt is used to affix a portion of a suspension control arm to a strut tower or other location. When the suspension is under duress, opposing forces act on the bolt, potentially breaking the bolt, degrading the suspension control arm, or otherwise harming the suspension of the vehicle, along with impairing the ride quality of the vehicle.

According to various embodiments of the present disclosure, a double-shear control arm mount is disclosed that can modify existing single-shear configurations to a double-shear configuration. The double-shear upper control arm can be bolted onto a strut tower or other vehicle portion through a front hood in some implementations. As such, difficult and costly welding is not required for installation.

The double-shear control arm mount includes a base configured to affix to a vehicle portion, as well as a first arm and a second arm. The first arm can be cantilevered with respect to the base, and can extend in a first direction beyond the vehicle portion, thereby defining a first mounting region. Similarly, the second arm can be cantilevered with respect to the base, and can extend in a second direction beyond the vehicle portion, thereby defining a second mounting region.

The first arm can include a first arm member and a first arm mounting surface angled relative to the first arm member. The first mounting region can be a position between the first arm mounting surface and the vehicle portion. Likewise, the second arm can include a second arm member and a second arm mounting surface angled relative to the second arm member. The second mounting region can be defined as a position between the second arm mounting surface and the vehicle portion.

The first mounting region is sized and positioned to receive a first extension of an upper suspension control arm, and the second mounting region is sized and positioned to receive a second extension of the upper suspension control arm. The vehicle portion can be a strut tower, as noted above, or can be a lower frame or other desired mounting location. The base can include apertures such that a multitude of bolts can be inserted through the apertures and corresponding holes in the vehicle portion to couple the base to the vehicle portion. As such, a bolt-on connection can be created between the base and the vehicle portion.

In some embodiments, the base can include a base mounting plate and an arm mounting plate affixed to the base mounting plate. The first arm and the second arm can be integral with the arm mounting plate in some examples. The base mounting plate can be affixed directly to a top surface of the vehicle portion. The arm mounting plate can be at least partially raised from the top surface of the vehicle portion. The first arm and the second arm can be configured to flex relative to the base in some implementations.

The double-shear control arm mount can further include strut bar brackets extending from a surface of the base. The strut bar brackets can include apertures, where bolts and like fasteners can be positioned through the apertures and corresponding apertures on a strut bar to couple to and retain the strut bar relative to the base.

The first arm mounting surface of the first arm can be angled relative to the first arm member at an angle between 80 and 120 degrees (e.g., 90 degrees). Similarly, the second arm mounting surface can be angled relative to the second arm member at an angle between 80 and 120 degrees (e.g., 90 degrees). The first arm and the second arm can thus be positioned above coupling points or extensions of an upper suspension control arm.

Figure 2:
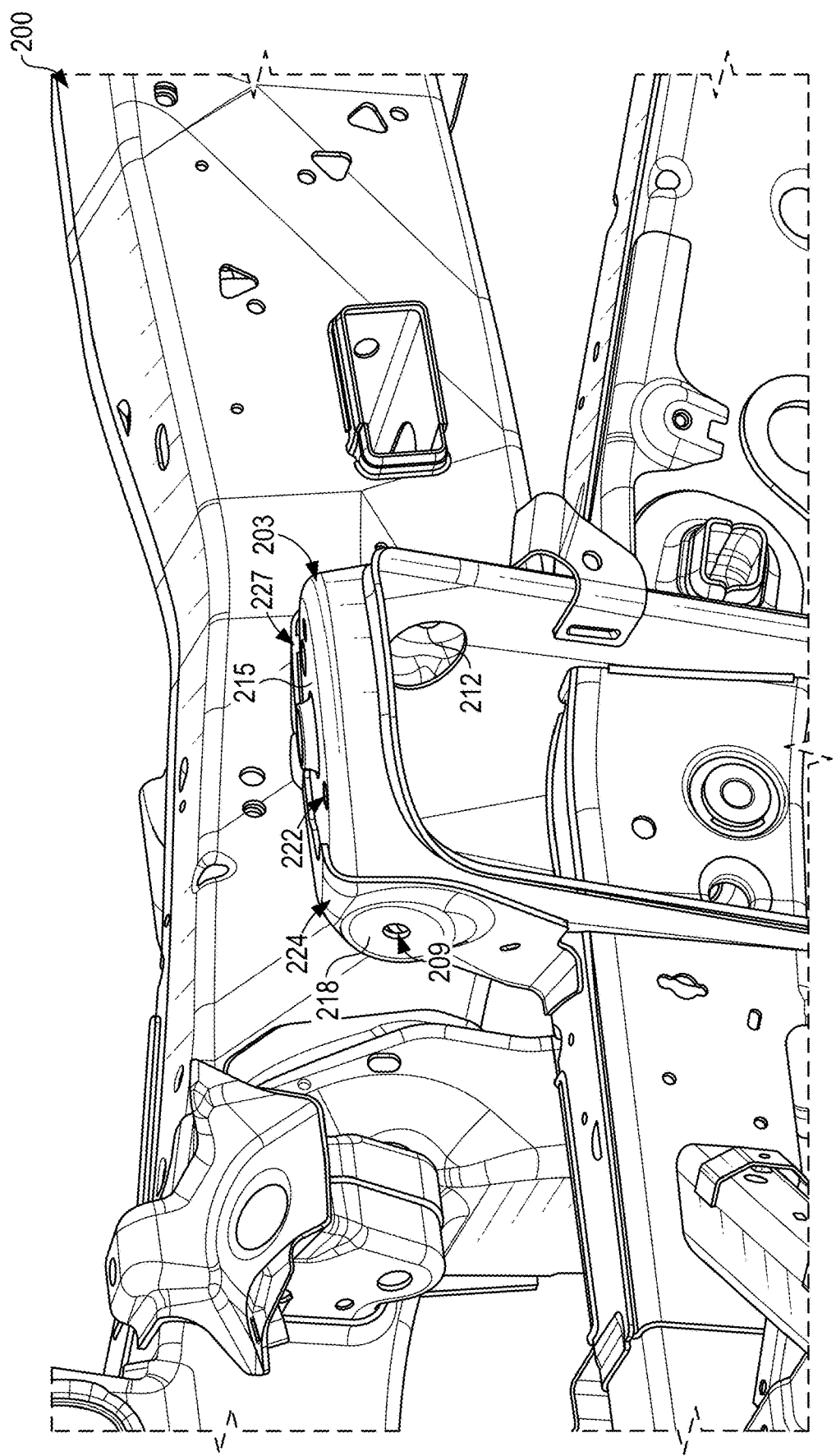
FIGS. 2 and 3 are opposing perspective views of the vehicle portion of FIG. 1 with the double-shear control arm mount omitted for explanatory purposes.
Figure 3:
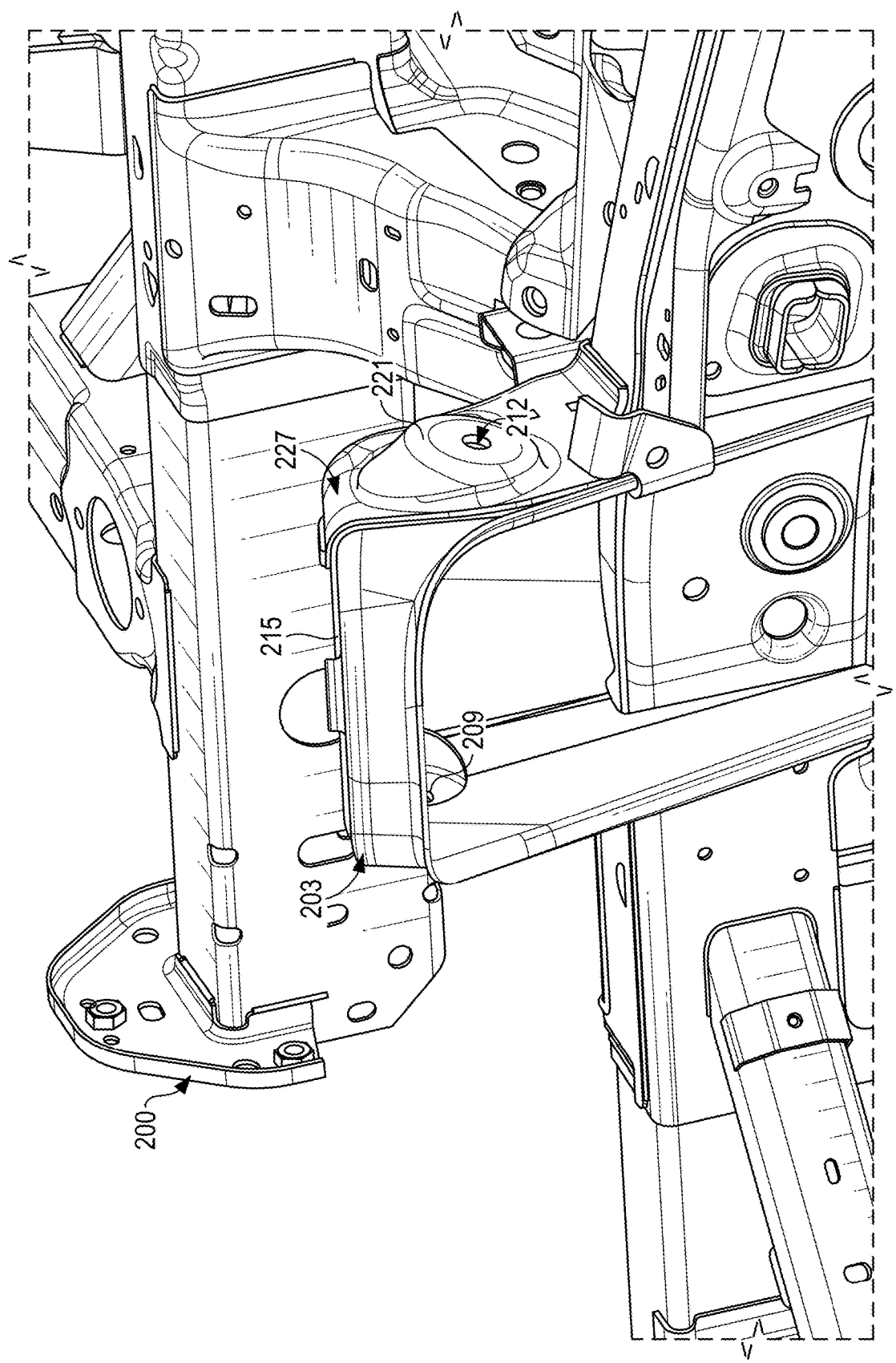

Turning now to the drawings, FIG. 1 is a perspective view of a double-shear control arm mount 100 (or "mount 100") shown relative to a vehicle 200 or a vehicle frame according to various embodiments of the present disclosure. FIGS. 2 and 3 are perspective views of the vehicle portion of FIG. 1 from opposing sides with the double-shear control arm mount 100 omitted for explanatory purposes. FIGS. 4-7 are side perspective views of an upper suspension control arm affixed to the double-shear control arm mount 100 according to various embodiments of the present disclosure.

Referring among FIGS. 1-7, the double-shear control arm mount 100 includes a base 103 configured to affix to a vehicle portion 203. The double-shear control arm mount 100 further includes arms 106, 109. The base 103 can be bolted onto the vehicle portion 203, which can facilitate installation of the double-shear control arm mount 100 without welding, which can be problematic due to small work areas, can be costly, and can require intensive labor. It is understood, however, that in some implementations, the double-shear control arm mount 100 can be welded or otherwise coupled to the vehicle portion 203.

The arms 106, 109 can extend from the base 103 such that the arms 106, 109 provide mounting regions 112, 115. The mounting regions 112, 115 are positioned between the arms 106, 109 and the vehicle portion 203. In the examples shown, the mounting regions 112, 115 are positioned below the arms 106, 109 or, in other words, the arms 106, 109 are positioned above the mounting regions 112, 115, providing a double-shear arrangement from above an upper suspension control arm (not shown). To this end, the double-shear control arm mount 100 can be positioned above an upper suspension control arm to provide an additional connection surface such that the upper suspension control arm can be mounted to the vehicle 200 in a double-shear manner, as will be described.

The arms 106, 109 include a first arm 106 and a second arm 109, for example, although additional arms can be envisioned should the upper suspension control arm (not shown) includes additional mounting locations. The first arm 106 and the second arm 109 can extend in a cantilevered manner from opposing sides of the base 103. In other words, the first arm 106 and the second arm 109 can extend beyond a perimeter of the base 103 and the vehicle portion 203 (e.g., a strut tower).

The first arm 106 and the second arm 109 can be configured to flex slightly relative to the base 103, which may facilitate forces acting upon suspension control arms. For example, the ability of the first arm 106 and the second arm 109 to flex relative to the base 103 may be facilitated by various factors. In some aspects, the material composition of the arms 106, 109 may contribute to their flexibility. For instance, the arms 106, 109 may be constructed from materials with suitable elastic properties, such as certain grades of steel or aluminum alloys. The thickness of the material used for the arms 106, 109 may also play a role in their ability to flex, with thinner sections potentially allowing for more flexibility than thicker ones.

The size and geometry of the arms 106, 109 may also permit flexing relative to the base. In some implementations, the length of the arms 106, 109 extending from the base may influence their flexibility, with longer arms potentially allowing for more flex than shorter ones. The cross-sectional profile of the arms may also be designed to facilitate controlled flexing. For example, the arms 106, 109 may have a tapered design, being thicker near the base 103 and gradually becoming thinner towards the ends, which may allow for more flexibility at the ends while maintaining rigidity near the base 103.

In some cases, the manner in which the arms 106, 109 are attached to or integrated with the base 103 may contribute to their ability to flex. For instance, if the arms 106, 109 are formed as an integral part of the arm mounting plate, the transition area between the base 103 and the arms 106, 109 may be designed to allow for some degree of flexing. Additionally, the cantilevered arrangement of the arms 106, 109 may inherently allow for some flexing due to the lack of support at the free end of each arm 106, 109.

The first arm 106 can include a first arm member 118 and a first arm mounting surface 121. In some embodiments, the first arm mounting surface 121 can be angled relative to the first arm member 118. For instance, the first arm mounting surface 121 of the first arm 106 can be angled relative to the first arm member 118 at a first angle between 80 and 120 degrees (e.g., 90 degrees).

Similarly, the first arm 109 can include a second arm member 124 and a second arm mounting surface 127. In some embodiments, the second arm mounting surface 127 can be angled relative to the second arm member 124. For example, the second arm mounting surface 127 of the second arm 109 can be angled relative to the second arm member 124 at a second angle between 80 and 120 degrees (e.g., 90 degrees).

The first arm mounting surface 121 can include a first arm mounting aperture 133, and the second arm mounting surface 127 can include a second arm mounting aperture 136. A bolt or like fastener can be inserted through a respective aperture 133, through an aperture of a respective upper suspension control arm extension, through a respective mounting hole 209, 212 of the vehicle portion 203, and secured to the vehicle portion 203 using a nut or like fastener. The first arm mounting surface 121 and the second arm mounting surface 127 thus provide additional mounting locations for an upper suspension control arm, as will be described. When extensions of the upper suspension control arms are positioned in the mounting regions 112, 115 and affixed to the mount 100 and the vehicle portion 203, the bolts retaining the upper suspension control arms are in double shear.

In various embodiments, the double-shear control arm mount 100 further includes strut bar brackets 142a, 142b (collectively "strut bar brackets 142"). The strut bar brackets 142 extend vertically from a surface of the base 103 in a vertical direction or in a direction orthogonal relative to the first arm 106 and the second arm 109. The strut bar brackets 142 can be coupled to one another via a cross-member 144 (FIG. 5) that extends between the strut bar brackets 142 positioned on opposing sides of the base 103. The cross-member 144 can include holes or other mounting components that facilitate mounting a wiring harness, cables, or like devices thereto.

The strut bar brackets 142 can include one or more apertures 145. The vehicle 200 can include a strut bar 300, also referred to as a strut brace or strut tower brace, having an end coupled to the double-shear control arm mount 100. For instance, the strut bar 300 can be coupled to the double-shear control arm mount 100 by positioning one or more bolts through the apertures 145 and correspondingly positioned channels of the strut bar 300 that retains the strut bar 300 relative to the strut bar brackets 142 and/or the base 103. The bolts can be secured using nuts or like devices. In some embodiments, however, the double-shear control arm mount 100 does not include the strut bar brackets 142.

Referring to FIGS. 2 and 3, the vehicle portion 203 is shown with the double-shear control arm mount 100 omitted for explanatory purposes. In various embodiments, as noted above, the vehicle portion 203 can include a strut tower, although the disclosure is not so limited and other portions of the vehicle 200, such as a lower frame, can be utilized. The vehicle portion 203 includes a top surface 215 and lateral mounting surfaces 218, 221. The base 103 can be configured to accommodate for surface irregularities on the top surface 215, as ill be described.

Generally, upper suspension control arms are mounted to the lateral mounting surfaces 218, 221 by positioned a bolt through extensions of an upper suspension control arm and the mounting holes 209, 212 which is, in turn, affixed to the vehicle 200 using a bolt, weld, or like connection process. In this configuration, the bolt is in single shear. When the suspension is in compression, the strut tower may impose downward forces on the bolt, whereas the upper suspension control arm may impose upward forces on the bolt. In some instances, the opposing forces can be so great that the bolt can shear or otherwise degrade, impairing performance of a suspension, affecting safety of the vehicle, degrading ride quality, and so on.

The top surface 215 of the vehicle portion 203 can include one or more apertures 222. The base 103 of the double-shear control arm mount 100 can include holes or other apertures that correspondingly align with the apertures 222 of the vehicle portion 203. As such, a bolt or like device can be used to bolt on or otherwise affix the base 103 to the top surface 215 of the vehicle portion 203. Moreover, in some types of vehicles, the top surface 215 of the vehicle portion 203 is accessible through a front hood of the vehicle 200. As such, the double-shear control arm mount 100 can be installed on a vehicle 200 without removing a substantial number of components and without welding or other costly process.

In some types of vehicles, the top surface 215 of the vehicle portion 203 is irregular. For instance, the top surface 215 of the vehicle portion 203 can include protruding portions 224, 227 that project from the top surface 215, potentially impairing the ability to mount the base 103 thereto and establish a stable coupling of the base 103 and the vehicle portion 203.

Figure 4:
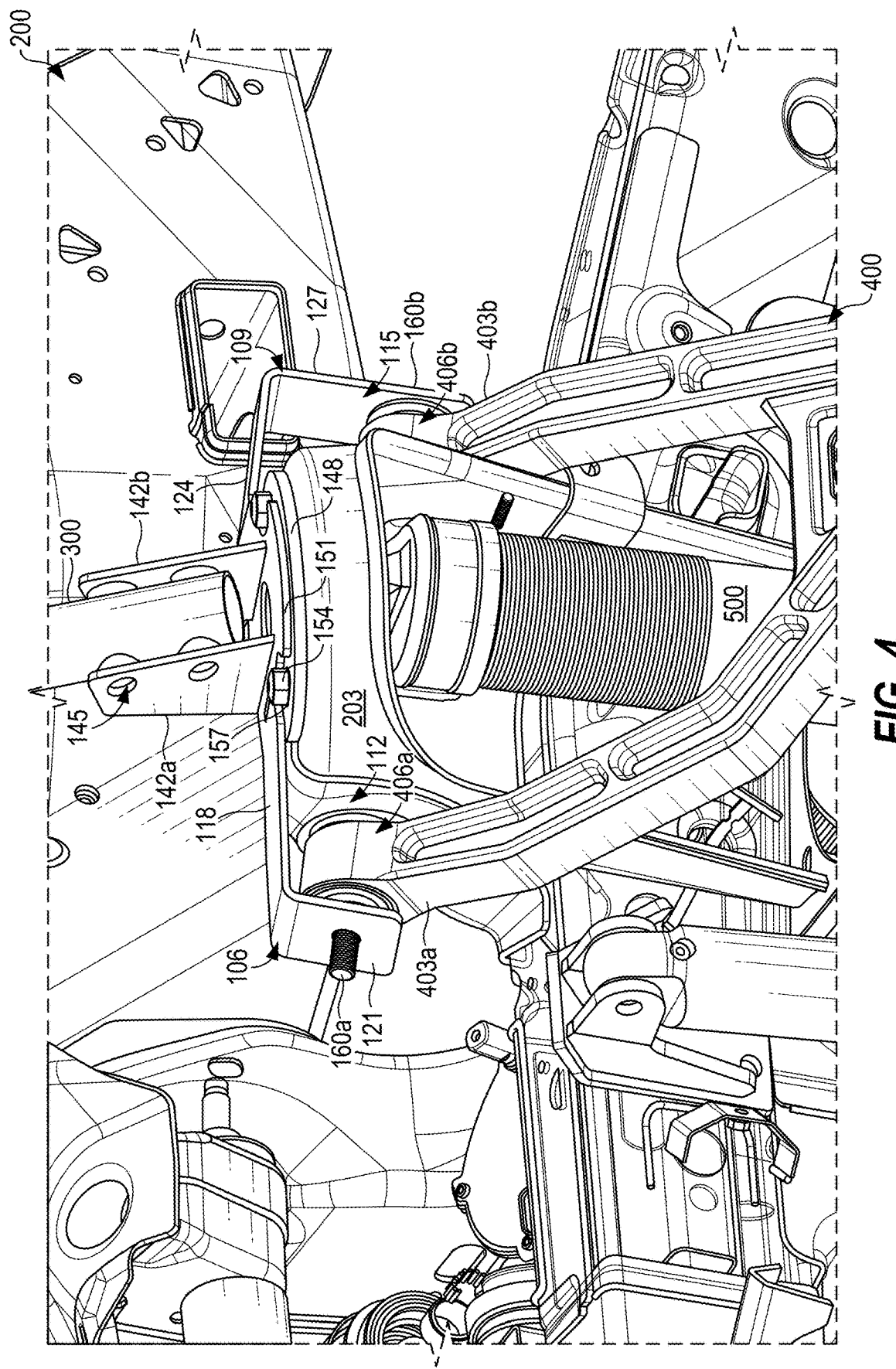
FIGS. 4-7 are side perspective views of an upper suspension control arm affixed to the double-shear control arm mount of FIG. 1 according to various embodiments of the present disclosure.
Figure 5:
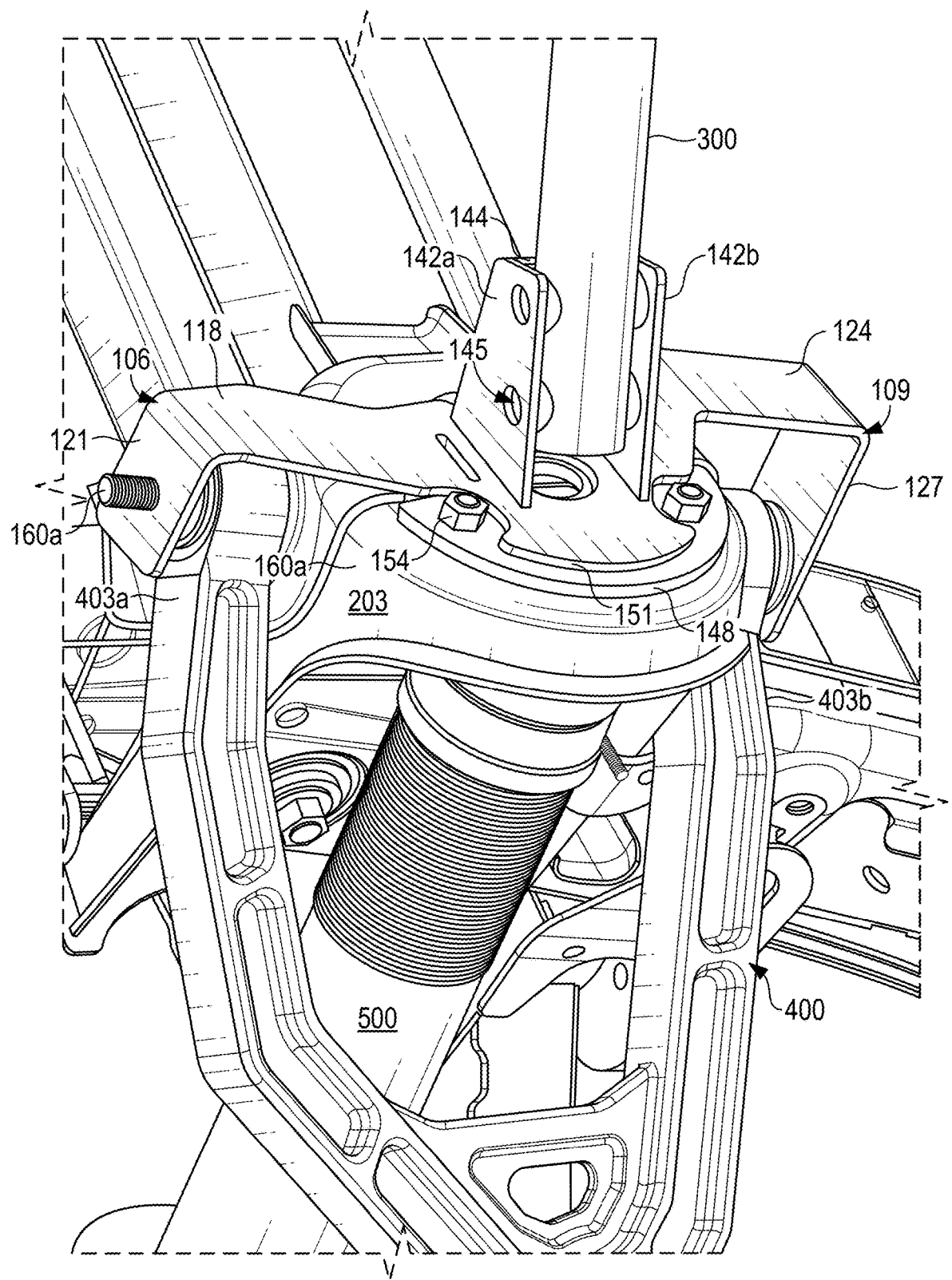
Figure 6:
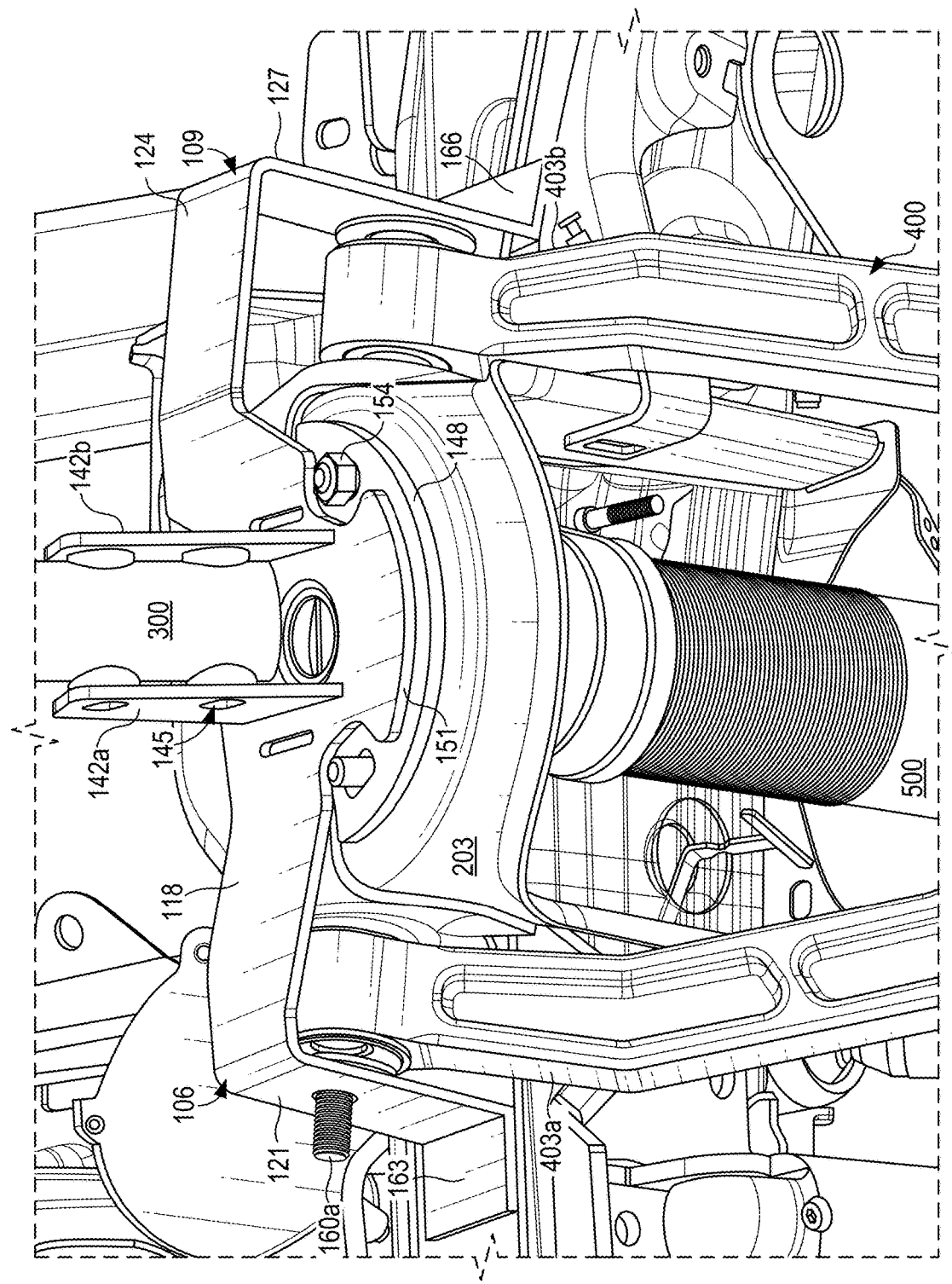

As best seen in FIGS. 4-6, the base 103 can include a first base portion 148 and a second base portion 151 in some implementations. The first base portion 148 can include a base mounting plate, and the second base portion 151 can include an arm mounting plate affixed to the base mounting plate, for example, where the first arm 106 and the second arm 109 can be integral with the arm mounting plate in some embodiments.

The first base portion 148 can be affixed directly to the top surface 215 of the vehicle portion 203, whereas the second base portion 151 can be slightly elevated or partially raised relative to the top surface 215 of the vehicle portion 203. The second base portion 151 can include a planar surface integral with or otherwise coupled to a top of a planar surface of the first base portion 148. In some embodiments, as shown in FIGS. 4-6, the arms 106, 109 are integral with the second base portion 151 and, as such, the arms 106, 109 are also slightly elevated relative to the top surface 215 of the vehicle portion 203.

As the arms 106, 109 can be integral with the second base portion 151 in various embodiments, the second base portion 151 and the arms 106, 109 can be formed from a same piece of material, e.g., by stamping a suitable shape from a piece of material and bending portions of the material to form the arms 106, 109. The second base portion 151 can be welded or otherwise affixed to the first base portion 148. Likewise, the strut bar brackets 142 can be welded to otherwise affixed to a top surface of the second base portion 151.

In some embodiments, the double-shear control arm mount 100 may be positioned below the extensions of the upper suspension control arm 400, instead of above. In this configuration, the base 103 of the mount 100 may be affixed to a lower portion of the vehicle frame 200 or to a lower surface of the strut tower or other vehicle portion 203. The arms 106 and 109 may extend upward from the base 103, with the arm mounting surfaces 121 and 127 angled inward to create mounting regions above the arms 106, 109, as can be appreciated.

FIGS. 4-6 further illustrate the vehicle 200 having an upper suspension control arm 400, a shock 500, and other vehicle components according to various embodiments. The upper suspension control arm 400 (or upper suspension control arm 400) includes a first control arm extension 403a and a second control arm extension 403b (collectively "control arm extensions 403"). The first arm 106 and the second arm 109 of the double-shear control arm mount 100 are configured to be positioned above coupling points of the upper suspension control arm 400, as will be described.

The first mounting region 112 is sized and positioned to receive a first control arm extension 403a of an upper suspension control arm 400, and the second mounting region 115 is sized and positioned to receive the second control arm extension 403b of the upper suspension control arm 400. The first extension 403a has a first mounting portion 406a positioned in the first mounting region 112, and the second extension 403b has a second mounting portion 406b positioned in the second mounting region 115.

As shown in FIGS. 4-6, the vehicle portion 203 can be a strut tower, where the base 103 has various apertures that align with apertures in the top surface 215 of the vehicle portion 203 to bolt on the double-shear control arm mount 100 to the vehicle portion 203. To this end, the double-shear control arm mount 100 can include one or more fasteners 154 (e.g., nuts and bolts) configured for insertion through apertures 157 of the base 103 to form a bolt-on connection between the base 103 and the strut tower or other vehicle portion 203. In some implementations, the apertures 157 are positioned in the first base portion 148. In various embodiments, however, the apertures 157 can be positioned in the first base portion 148 and/or the second base portion 151. The second base portion 151 can include cut-outs to accommodate for fasteners 154 positioned through apertures 157 of the first base portion 148.

A first fastener 160a can be inserted through apertures located on first arm mounting surface 121, first control arm extension 403a, and mounting hole 209, and secured to the vehicle portion 203 using a nut or like component. A second fastener 160b can be inserted through apertures located on second arm mounting surface 127, first control arm extension 403b, and mounting hole 212, and secured to the vehicle portion 203 using a nut or like component. The first fastener 106a and/or the second fastener 160b can include bolts, rods, or like devices. As shown in FIGS. 4-6, a nut can be secured to a first end of a bolt proximal to the respective arm mounting surface 121, 127, and/or a second end of the bolt proximal to the vehicle portion 203. As such, when the extensions 406 of the upper suspension control arm 400 are positioned in the mounting regions 112, 115 and affixed to the mount 100 and the vehicle portion 203, the fasteners 160 retaining the upper suspension control arm 400 are in double shear.

Referring specifically to the embodiment shown in FIG. 6, variations of the first arm 106 and the second arm 109 are shown according to various embodiments. In the embodiments of FIGS. 1-5, the first arm 106 and the second arm 109 are shown as partially floating. For instance, first ends of the first arm 106 and the second arm 109, respectively, are coupled to or integral with the base 103, whereas second, opposing ends of the first arm 106 and the second arm 109, respectively, are not coupled to any component, or are only affixed to an upper suspension control arm 400.

In the embodiment of FIG. 6, the first arm 106 and the second arm 109 can include a first arm mount 163 and a second arm mount 166, respectively. The first arm mount 163 and/or the second arm mount 166 can be bolted on, welded, or otherwise affixed to a portion of the vehicle 200 (or the vehicle frame). The first arm mount 163 can be integral with the firm arm 106 or, more specifically, the first arm mounting surface 121 and the firm arm member 118. As such, a single piece of material can be bent or otherwise deformed to form the first arm member 118, the first arm mounting surface 121, and the first arm mount 163. Likewise, the second arm mount 166 can be integral with the second arm 109 or, more specifically, the second arm mounting surface 127 and the second arm member 124. As such, a single piece of material can be bent or otherwise deformed to form the second arm member 124, the second arm mounting surface 127, and the second arm mount 166. It is understood that the arm mounts 163, 166 can provide additional structural rigidity and provide an additional contact for force dissipation, minimizing forces acting on the upper suspension control arm 400 (e.g., the bushings thereof), the fasteners 160, and so forth.

The first arm mount 163 and the first arm mounting surface 121 can be angled relative to one another at an angle between 80 and 120 degrees (e.g., 90 degrees). Similarly, the second arm mount 166 and the second arm mounting surface 127 can be angled relative to one another at an angle between 80 and 120 degrees (e.g., 90 degrees). These angles can be substantially similar or identical in some embodiments.

Similarly, the first arm 109 can include a second arm member 124 and a second arm mounting surface 127. In some embodiments, the second arm mounting surface 127 can be angled relative to the second arm member 124. For example, the second arm mounting surface 127 of the second arm 109 can be angled relative to the second arm member 124 at a second angle between 80 and 120 degrees (e.g., 90 degrees).

Figure 7:
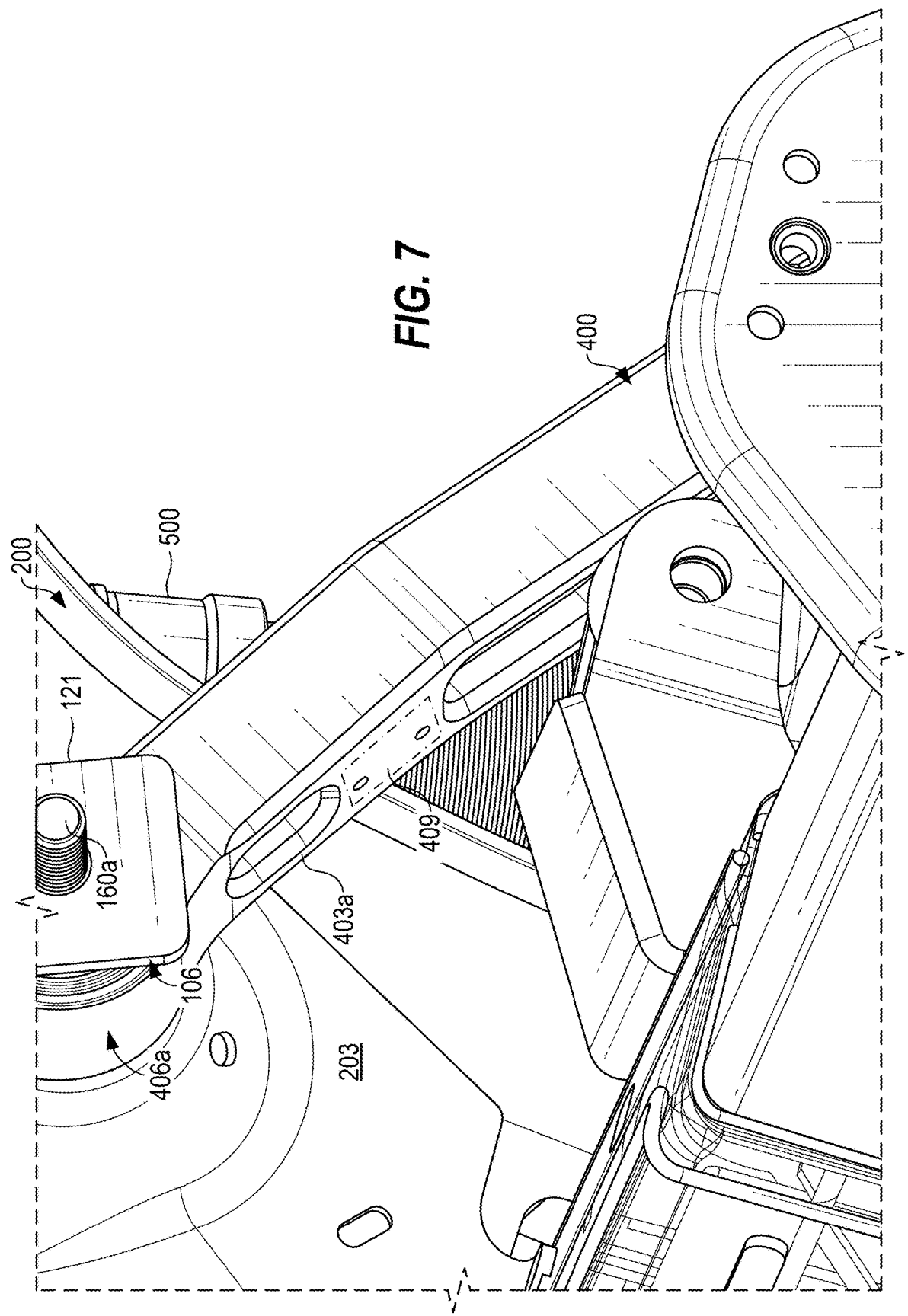

Turning now to FIG. 7, a lower side perspective view of the upper suspension control arm 400 is shown in double shear via the double-shear control arm mount 100. In some embodiments, a sensor (not shown) can be mounted to the upper suspension control arm 400, for instance, at a sensor mounting location 409. The sensor positioned at the sensor mounting location can include a live action sensor configured to measure activity of the upper suspension control arm 400, the shock 500, and so forth, which measures certain characteristics of the suspension system. When a bushing of the upper suspension control arm 400 is in single shear, deflection of the bushing can impair the accuracy of measurements taken by the sensor and generate false readings. The double-shear control arm mount 100 thus retains the bushing of the upper suspension control arm 400 in double shear, minimizing forces acting on the bushing and/or the fasteners 160, thereby improving the accuracy of measurements taken by the sensor.

Figure 8:
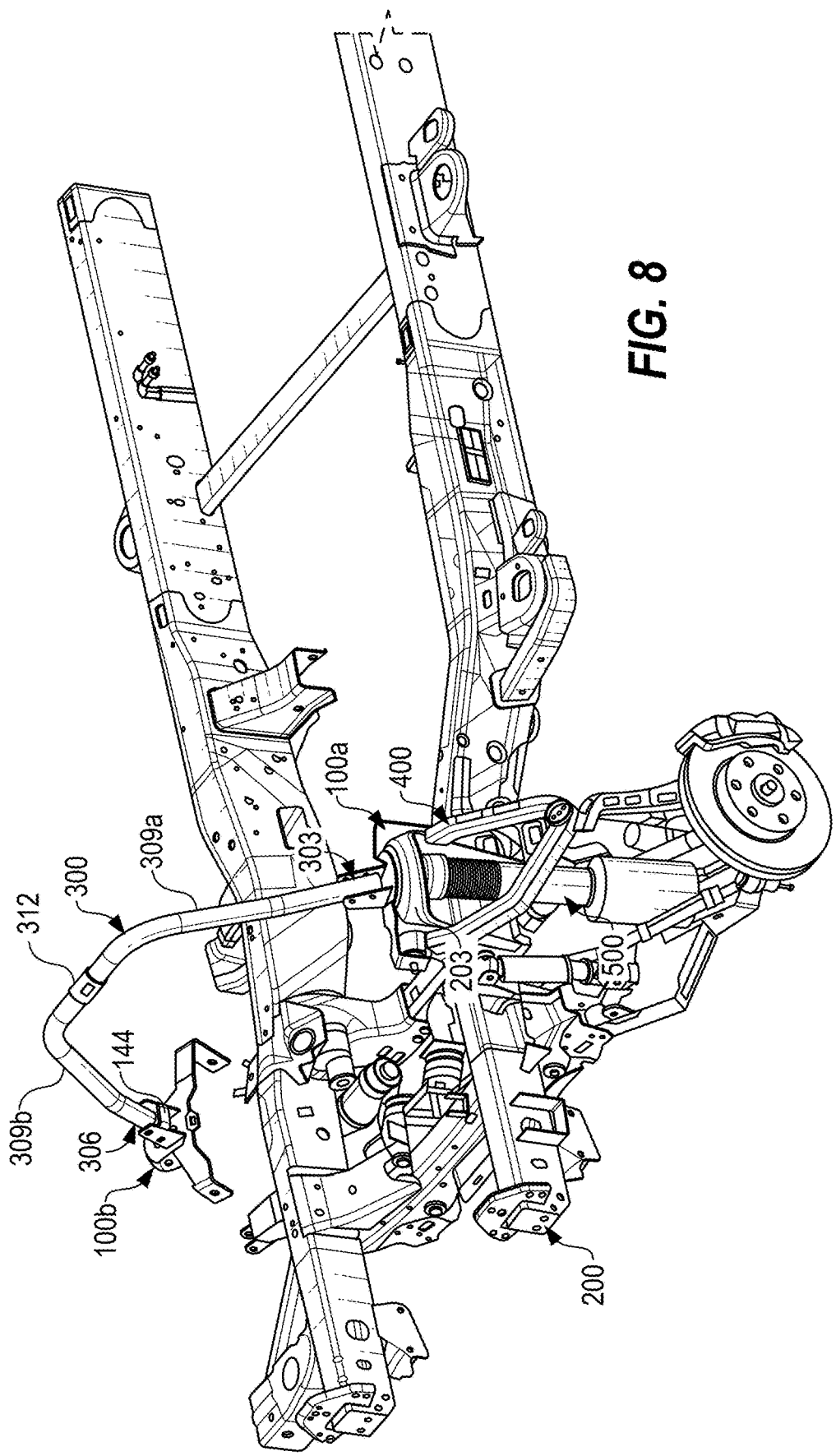
FIGS. 8 and 9 are top perspective views of a strut bar having ends coupled to first and second double-shear control arm mounts according to various embodiments of the present disclosure.
Figure 9:
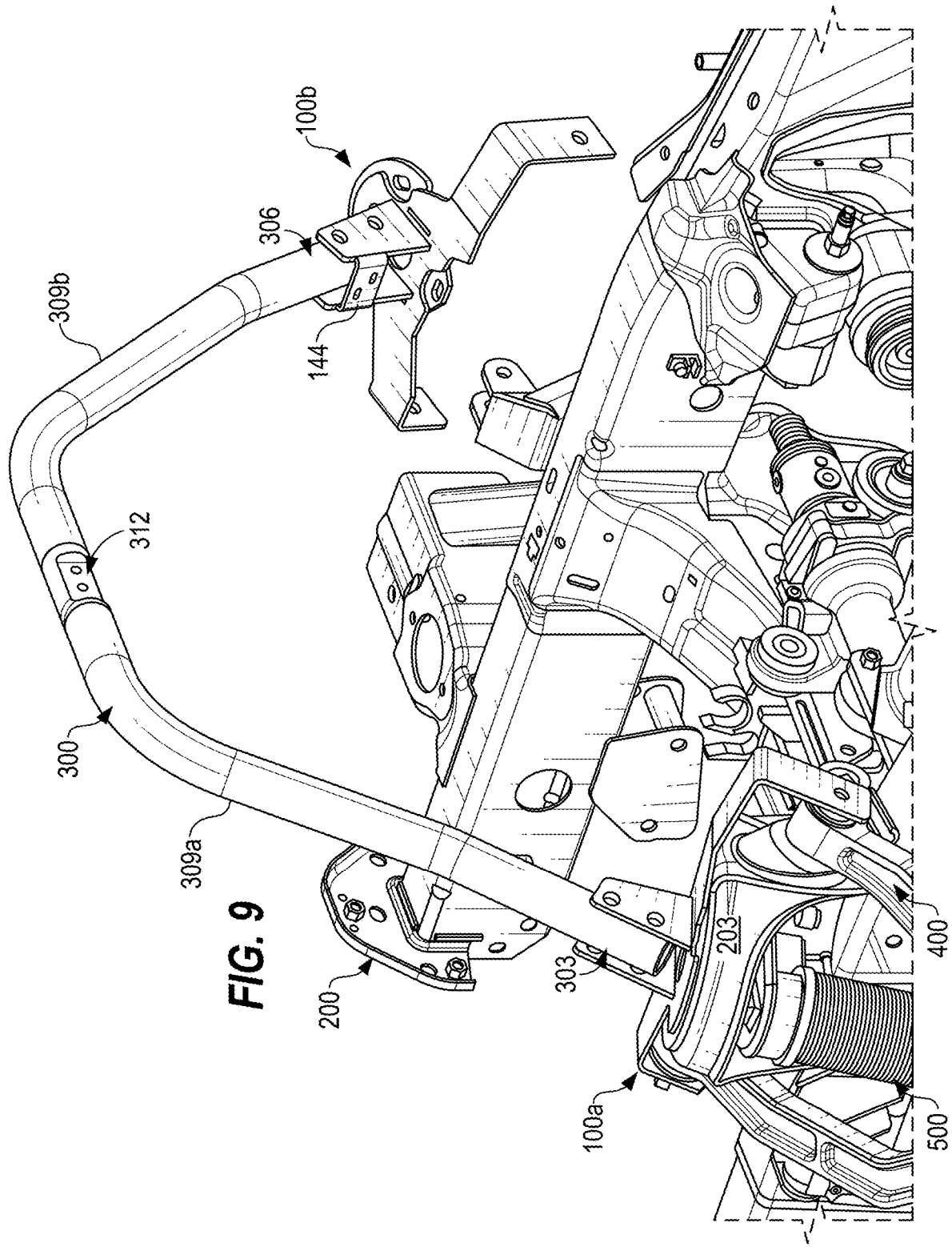

FIGS. 8 and 9 show perspective views of a portion of a frame of a vehicle 200 with two identical, or substantially similar, double-shear control arm mounts 100a, 100b (collectively "double-shear control arm mounts 100"). While one strut tower is shown as an example of a vehicle portion 203, a second strut tower is omitted for explanatory purposes. It is understood, however, that an identical strut tower can be positioned on the other side of the vehicle 200 in an opposing orientation. Thus, the vehicle 200 can include two vehicle portions 203, where the first double-shear control arm mount 100a is affixed to a first of the vehicle portions 203 (e.g., a first strut tower), and the second double-shear control arm mount 100b is affixed to a second of the vehicle portions 203 (e.g., a second strut tower)

A first upper suspension control arm 400 can be affixed or otherwise coupled to the first strut tower and the arms of the first double-shear control arm mount and, similarly, a second upper suspension control arm 400 can be affixed or otherwise coupled to the second strut tower and the arms of the second double-shear control arm mount. The strut bar 300 can include a first end 303 coupled to the first double-shear control arm mount 100a and a second end 306 coupled to the second double-shear control arm mount 100b.

The strut bar 300, for example, can have ends coupled to the double-shear control arm mounts 100 using bolts or other fasteners positioned through apertures in the ends of the strut bar 300 as well as corresponding apertures 145 of the strut bar brackets 142a, 142b. The strut bar 300 may extend upward (towards a top of the vehicle 200) such that the strut bar 300 clears an engine, a supercharger coupled to the engine, and so forth. In some implementations, the strut bar 300 includes a first struct bar section 309a and a second strut bar section 309b that are coupled to one another at a coupling point 312.

While various embodiments described herein relate to the double-shear control arm mount 100 being used with an upper suspension control arm 400, the mount 100 may be adapted for various other applications within a vehicle suspension and chassis system. In some aspects, the mount 100 may be used to provide double-shear support for lower control arms, enhancing the stability and load distribution of the lower suspension components. The mount 100 may also be adapted for use with sway bar end links, providing a more robust connection between the sway bar and a vehicle frame or suspension components. In some implementations, the double-shear control arm mount 100 may be utilized to reinforce mounting points for shock absorbers or struts, distributing the forces more evenly across the frame of a vehicle 200. The mount 100 may also be adapted for use with steering components, such as tie rods or steering arms, to improve steering precision and durability in high-stress applications.

In some cases, the double-shear control arm mount 100 may be modified for use in body-to-frame mounting applications, providing additional strength and rigidity at critical connection points between a body and a frame. The mount 100 may also be adapted for use in engine mount applications, helping to distribute engine loads more evenly and reduce vibration transmission to the vehicle's frame. The versatility of the double-shear control arm mount 100 design may allow it to be used in various other automotive applications where increased strength, stability, and load distribution are desired. The specific application and design modifications may vary depending on the particular vehicle model, suspension design, and performance requirements.

The double-shear control arm mount 100 may be constructed from various materials suitable for automotive applications. As examples, the mount 100 may be fabricated from metals such as steel, aluminum, or alloys thereof. The base 103, arms 106 and 109, and other components may be made from high-strength steel to provide rigidity and durability in some cases, and other suitable materials can be relied upon. In some cases, lightweight materials such as aluminum alloys may be used to reduce overall vehicle weight while maintaining structural integrity. The mount 100 may also incorporate composite materials in certain portions to optimize strength-to-weight ratios. In some implementations, the strut bar brackets 142 may be constructed from the same material as the base 103, or may utilize a different material selected for specific performance characteristics. The choice of materials for the mount 100 may vary depending on factors such as vehicle specifications, performance requirements, and manufacturing considerations.

The double-shear control arm mount 100 may be formed using any suitable manufacturing process. In some aspects, the mount 100 may be fabricated through a stamping process, where a sheet of metal is pressed between dies to create the desired shape. The arms 106 and 109 may be formed by bending portions of the stamped sheet metal. In some cases, the mount 100 may be cast as a single piece using methods such as investment casting or die casting, which can allow for complex geometries and potentially reduce the number of separate components. The mount 100 may also be machined from a solid block of material, beneficial for low-volume production or prototype units. In some implementations, the base 103 and arms 106, 109 may be fabricated separately and then welded or bolted together. Additive manufacturing techniques, such as three-dimension (3D) printing of metals or composites, may be employed for producing the mount 100, beneficial for customized or small-batch applications. The specific manufacturing method chosen may depend on factors such as production volume, material selection, cost considerations, and desired performance characteristics.

The double-shear control arm mount 100 may offer several benefits over single-shear configurations in vehicle suspension systems. In some aspects, double-shear arrangements may provide improved load distribution and reduced stress concentration compared to single-shear designs. This may result in enhanced durability and longevity of suspension components, particularly in high-stress applications or extreme driving conditions. Double-shear configurations may also offer increased resistance to bending and torsional forces, potentially improving the overall stability and handling characteristics of the vehicle.

In some implementations, the double-shear control arm mount 100 may provide better alignment retention for suspension components, as the forces are distributed across two shear planes rather than one. This may help maintain more consistent suspension geometry over time, potentially improving tire wear characteristics and overall vehicle performance. Double-shear arrangements may also offer enhanced resistance to fastener loosening or failure, as the loads are shared between multiple mounting points. Further, the double-shear control arm mount 100 may provide increased stiffness to the suspension system, which may be particularly beneficial in performance or racing applications where precise control of suspension movement is desired. In some cases, the additional mounting points provided by a double-shear configuration may allow for easier fine-tuning of suspension settings, offering greater flexibility in adjusting the vehicle's handling characteristics to suit different driving conditions or preferences.

The drawings of the double-shear control arm mount 100 are not necessarily to scale, and in some instances, proportions may have been exaggerated for clarity of illustration. In particular, the double-shear control arm mount 100 and its various components as depicted in the figures are shown in a simplified form and may not reflect exact dimensions or proportions. The relative sizes, shapes, and positions of elements may be modified or idealized in the drawings to facilitate understanding of the principles and functionality of the double-shear control arm mount 100. It should be understood that the actual dimensions, proportions, and configurations of the double-shear control arm mount 100 and its components may vary based on specific design requirements, manufacturing processes, intended vehicles, and envisioned applications.

The features, structures, or characteristics described above can be combined in one or more embodiments in any suitable manner, and the features discussed in the various embodiments can be interchangeable, if possible. In the following description, numerous specific details are provided in order to fully understand the embodiments of the present disclosure. However, a person skilled in the art will appreciate that the technical solution of the present disclosure can be practiced without one or more of the specific details, or other methods, components, materials, and the like can be employed. In other instances, well-known structures, materials, or operations are not shown or described in detail to avoid obscuring aspects of the present disclosure.

Although the relative terms such as "on," "below," "upper," and "lower" are used in the specification to describe the relative relationship of one component to another component, these terms are used in this specification for convenience only, for example, as a direction in an example shown in the drawings. It should be understood that if the device is turned upside down, the "upper" component described above will become a "lower" component. When a structure is "on" another structure, it is possible that the structure is integrally formed on another structure, or that the structure is "directly" disposed on another structure, or that the structure is "indirectly" disposed on the other structure through other structures.

In this specification, the terms such as "a," "an," "the," and "said" are used to indicate the presence of one or more elements and components. The terms "comprise," "include," "have," "contain," and their variants are used to be open ended, and are meant to include additional elements, components, etc., in addition to the listed elements, components, etc. unless otherwise specified in the appended claims.

The terms "first," "second," etc. are used only as labels, rather than a limitation for a number of the objects. It is understood that if multiple components are shown, the components can be referred to as a "first" component, a "second" component, and so forth, to the extent applicable.

The above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

Therefore, the following is claimed:

1. A vehicle, comprising:
a first strut tower and a second strut tower;
a first double-shear control arm mount affixed to the first strut tower, and a second double-shear control arm mount affixed to the second strut tower, each of the first and the second double-shear control arm mounts comprising a base and arms extending from sides of the base;
a first upper suspension control arm coupled to the first strut tower and the arms of the first double-shear control arm mount;
a second upper suspension control arm coupled to the second strut tower and the arms of the second double-shear control arm mount; and
a strut bar having a first end coupled to the first double-shear control arm mount and a second end coupled to the second double-shear control arm mount,
wherein the first double-shear control arm mount and the second double-shear control arm mount are affixed to the first strut tower and the second strut tower, respectively, using a plurality of bolts.

2. The vehicle according to claim 1, wherein:
the arms of the first double-shear control arm mount and the second double-shear control arm mount each comprise an arm member and an arm mounting surface angled relative to the arm member; and
the first upper suspension control arm and the second upper suspension control arm each comprise mounting portions positioned in mounting regions defined as an area between respective ones of the strut towers and the arm mounting surface.

3. The vehicle according to claim 1, wherein:
the plurality of bolts are a first plurality of bolts;
the first double-shear control arm mount and the second double-shear control arm mount each comprise strut bar brackets extending from a surface of a respective base, the strut bar brackets comprising a plurality of apertures; and the first end and the second end of the strut bar are coupled to the strut bar brackets of the first double-shear control arm mount and the second double-shear control arm mount, respectively, using a second plurality of bolts.

4. The vehicle according to claim 3, wherein the strut bar brackets are positioned on opposing sides of the base, and the vehicle further comprises a cross-member extending between the strut bar brackets.

5. The vehicle according to claim 1, wherein each of the base of the first double-shear control arm mount and the base of the second double-shear control arm mount comprises a base mounting plate and an arm mounting plate integral with the base mounting plate, wherein the arm mounting plate is raised from a top surface of the respective strut tower to define a gap between a portion of the arm mounting plate and the top surface of the respective strut tower.

6. The vehicle according to claim 1, wherein the first and second double-shear control arm mounts are configured to flex relative to their respective strut towers to absorb forces transmitted through the strut bar during vehicle operation.

7. A double-shear control arm mount, comprising:
a base configured to affix to a vehicle portion;
a first arm cantilevered with respect to the base extending in a first direction beyond the vehicle portion defining a first mounting region, the first arm comprising a first arm member and a first arm mounting surface angled relative to the first arm member, the first mounting region being positioned between the first arm mounting surface and the vehicle portion;
a second arm cantilevered with respect to the base extending in a second direction beyond the vehicle portion defining a second mounting region, the second arm comprising a second arm member and a second arm mounting surface angled relative to the second arm member, the second mounting region being positioned between the second arm mounting surface and the vehicle portion;
a plurality of strut bar brackets extending from a surface of the base, the strut bar brackets comprising a plurality of apertures, and a plurality of bolts configured to be positioned through the apertures to retain a strut bar relative to the base.

8. The double-shear control arm mount according to claim 7, wherein the first mounting region is sized and positioned to receive a first extension of an upper suspension control arm, and the second mounting region is sized and positioned to receive a second extension of the upper suspension control arm.

9. The double-shear control arm mount according to claim 7, wherein the vehicle portion is a strut tower, the base comprises a plurality of apertures, and the double-shear control arm mount comprises a plurality of bolts configured for insertion through the apertures to form a bolt-on connection between the base and the strut tower.

10. The double-shear control arm mount according to claim 7, wherein the base comprises a base mounting plate and an arm mounting plate affixed to the base mounting plate, the first arm and the second arm being integral with the arm mounting plate.

11. The double-shear control arm mount according to claim 10, wherein the base mounting plate is affixed directly to a top surface of the vehicle portion, and the arm mounting plate is at least partially raised from the top surface of the vehicle portion.

12. The double-shear control arm mount according to claim 7, wherein the first arm and the second arm are configured to flex relative to the base.

13. The double-shear control arm mount according to claim 7, wherein the vehicle portion is a lower frame.

14. The double-shear control arm mount according to claim 7, wherein the first arm mounting surface is angled relative to the first arm member at a first angle between 80 and 120 degrees, and the second arm mounting surface is angled relative to the second arm member at an angle between 80 and 120 degrees.

15. The double-shear control arm mount according to claim 7, wherein the first arm and the second arm are configured to be positioned above coupling points of an upper suspension control arm.

16. A system, comprising:
a double-shear control arm mount, comprising:
a base configured to affix to a vehicle portion; and
arms extending from the base defining mounting regions positioned between the arms and the vehicle portion, wherein the mounting regions are positioned below the arms;
a plurality of strut bar brackets extending from a surface of the base, the strut bar brackets comprising a plurality of apertures; and
a strut bar having one end coupled to the double-shear control arm mount using a plurality of bolts positioned through the apertures of the strut bar brackets that retain the strut bar relative to the base.

17. The system according to claim 16, wherein the arms comprise a first arm and a second arm positioned on opposing sides of the base.

18. The system according to claim 16, wherein:
the arms comprise a first arm and a second arm;
the first arm comprises a first arm member and a first arm mounting surface angled relative to the first arm member; and
the second arm comprises a second arm member and a second arm mounting surface angled relative to the second arm member.

19. The system according to claim 18, wherein:
the mounting regions comprise a first mounting region positioned between a first side of the vehicle portion and the first arm mounting surface, and a second mounting region positioned between a second side of the vehicle portion and the second arm mounting surface; and
the system further comprises an upper suspension control arm having a first mounting portion positioned in the first mounting region, and a second mounting portion positioned in the second mounting region.

20. The system according to claim 16, wherein the double-shear control arm mount is configured to bolt on to the vehicle portion using a plurality of bolts.

* * * * *